3,138,619
Δ²,⁴-PREGNADIENES
Albert Bowers and Lawrence H. Knox, Mexico City, Mexico, assignors, by mesne assignments, to Syntex Corporation, a corporation of Panama
No Drawing. Filed Feb. 14, 1962, Ser. No. 173,137
21 Claims. (Cl. 260—397.45)

The present invention relates to novel cyclopentanophenanthrene derivatives and to a process for the production thereof.

More particularly the present invention relates to the novel Δ²,⁴-pregnadiene-11β,17α,21-triol-1,20-dione, Δ²,⁴-pregnadiene-17α,21-diol-1,11,20-trione, the 16-methyl derivatives thereof and the corresponding 21-esters.

The novel compounds of the present invention are represented by the following formula:

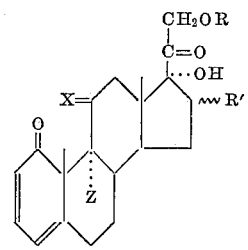

In the above formula R represents hydrogen or a hydrocarbon carboxylic acyl group of less than 12 carbon atoms; R¹ represents α-methyl, β-methyl or hydrogen; X may be =O or

and Z represents hydrogen or fluorine.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formula have anti-inflammatory properties and glycogen deposition activity. In addition they involute the thymus, and are anti-estrogenic and anti-gonadotrophic hormones.

The novel compounds object of this invention are prepared by the process exemplified by the following equation:

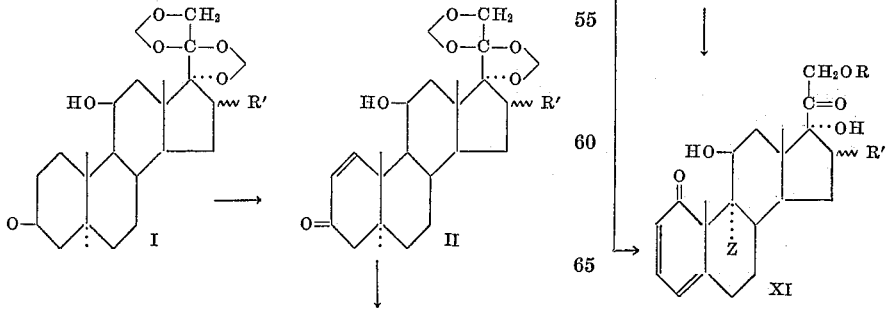

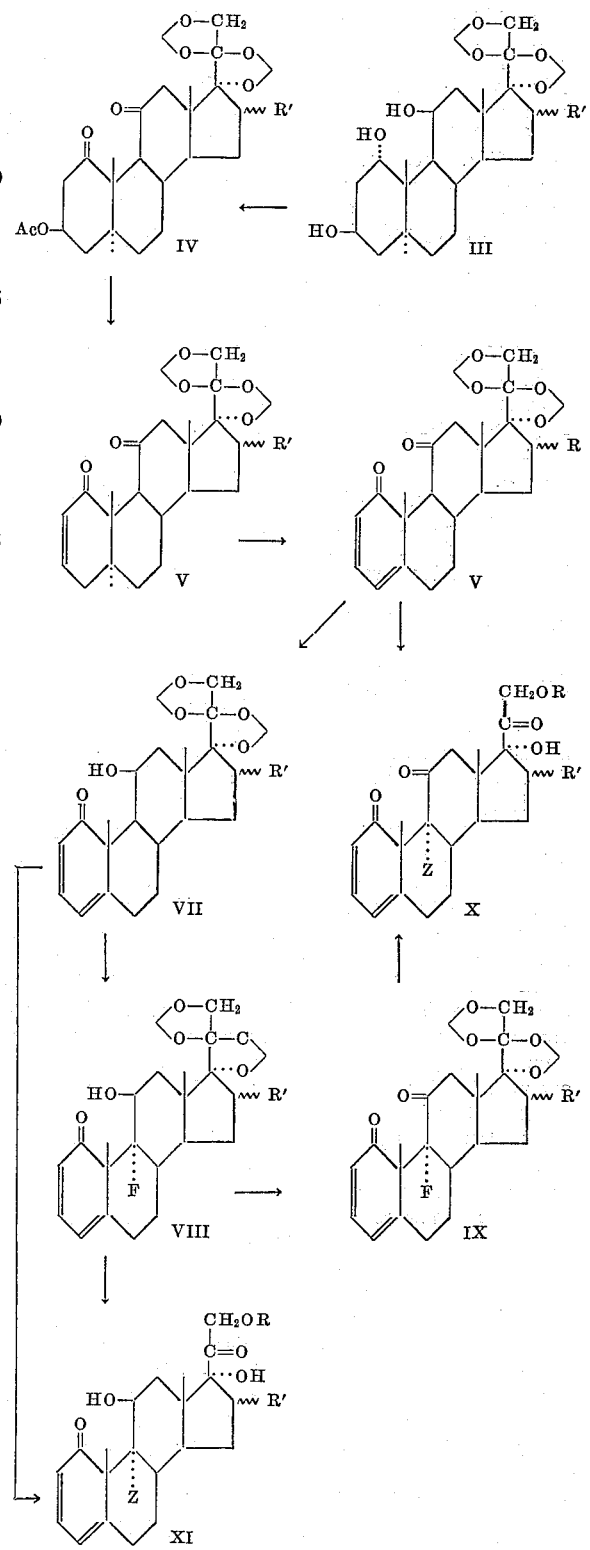

In the above formulas R, R¹ and Z have the same meaning as previously described.

In practicing the process just outlined, a compound selected from the group consisting of hydrocortisone, 16α and 16β-methyl hydrocortisone is conventionally treated with formaldehyde in the presence of an acid to give the respective 17,20;20,21-bismethylenedioxy derivative. Reduction of the Δ⁴-3-keto moiety of the latter derivative with an alkali metal, preferably lithium, in liquid ammonia, furnishes the corresponding 17,20;20,21-bismethylenedioxy-allopregnan-11β-ol-3-one compound (I). This compound is treated with approximately 1 molar equivalent of bromine in the presence of hydrogen bromide to give the 2α-bromo derivative thereof, which when dehydrobrominated as by reflux with calcium carbonate in dimethyl formamide affords the corresponding 17,20;20,21-bismethylenedioxy - Δ¹ - allopregnen-11β-ol-3-one (II). Reaction of the latter compound with hydrogen peroxide in the presence of sodium hydroxide is productive of the corresponding 1α,2α-oxide, which upon reduction as by refluxing with lithium aluminum hydride in an inert solvent, such as tetrahydrofuran, furnishes the corresponding 17,20;20,21 - bismethylenedioxy - allopregnane-1α,3β,11β-triol (III). Acetylation of the latter steroid with approximately 1 molar equivalent of acetic anhydride in pyridine gives the 3-acetate thereof which upon oxidation, such as with 8 N chromic acid yields the corresponding 17,20;20,21 - bismethylenedioxy - allopregnan-3β-ol-1,11-dione-acetate (IV). Treatment of the latter compound with potassium acetate in a suitable solvent e.g. methanol, at reflux temperature, for a period of time in the order of 1 hour, affords the corresponding 17,20;20,21 - bismethylenedioxy - allopregnene-1,11-dione (V). Reaction of this compound with N-bromo succinimide in an inert solvent such as carbon tetrachloride, preferably under irradiation with an electric lamp, is productive of the 4β-bromo derivative which upon dehydrobromination as by refluxing with calcium carbonate in dimethyl formamide produces the corresponding 17,20;20,21-bismethylenedioxy - Δ²,⁴ - pregnadiene-1,11-dione (VI). Upon reduction of the ketone groups, e.g. with lithium aluminum hydride, there is produced the 1β,11β-dihydroxy derivative which after selective oxidation of the allylic 1β-hydroxyl group, preferably with 2,3-dichloro-5,6-dicyano-1,4-benzoquinone furnishes the corresponding 17,20;20,21 - bismethylenedioxy-Δ²,⁴-pregnadien-11β-ol-1-one (VII). Dehydration of the latter compound, preferably with mesyl chloride in pyridine and dimethyl formamide, yields the corresponding Δ²,⁴,⁹⁽¹¹⁾-pregnatriene derivative. Treatment of this compound under Fried conditions, i.e. with N-bromoacetamide in the presence of perchloric acid, and further reaction of the obtained 9α-bromo-11β-ol with a mild base such as potassium acetate, affords the corresponding 9β,11β-oxido compound. The oxide ring is opened by treatment with hydrogen fluoride in an inert solvent, such as tetrahydrofuran, thus giving the corresponding 9α-fluoro-17,20;20,21 - bismethylenedioxy - Δ²,⁴ - pregnadien-11β-ol-1-one (VIII) which upon oxidation, e.g. with Jones' reagent, yields the corresponding 9α-fluoro-17,20;20,21-bismethylenedioxy-Δ²,⁴-pregnadiene-1,11-dione (IX).

The 17,20;20,21-bismethylenedioxy group of the compounds represented by formulas (VI, IX) and (VII, VIII) is conventionally hydrolyzed in an acid medium, preferably formic acid to give respectively the corresponding Δ²,⁴-pregnadiene-17α,21-diol-1,11,20 - trione derivatives (X; R=H) and Δ²,⁴-pregnadiene-11β,17α,21-triol-1,20-dione derivatives (XI; R=H). Conventional acylation of these 21-free alcohols with an acylating agent, as for example an anhydride of a hydrocarbon carboxylic acid of the type defined hereinbefore, in pyridine, produces the corresponding 21-acylates (X, XI; R=acyl).

The following specific examples serve to illustrate, but are not intended to limit the scope of the present invention:

Example I

To a solution of 5 g. of hydrocortisone in 200 cc. of chloroform were added 40 cc. of 37% aqueous formaldehyde and 5 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 17,20;20,21 - bismethylene - dioxy - Δ⁴ - pregnen-11β-ol-3-one.

When applying the above technique to the starting compounds under I, there were obtained the corresponding products under II.

| I | II |
|---|---|
| 16β-methyl-hydrocortisone | 16β-methyl-17,20;20,21-bismethylenedioxy-Δ⁴-pregnen-11β-ol-3-one. |
| 16α-methyl-hydrocortisone | 16α-methyl-17,20;20,21-bismethylenedioxy-Δ⁴-pregnen-11β-ol-3-one. |

Example II

A solution of 1 g. of 17,20;20,21-bismethylenedioxy-Δ⁴-pregnen-11β-ol-3-one, in 80 cc. of dioxane-ether (1:1) was added in a steady stream to a solution of 0.4 g. of lithium in 400 cc. of anhydrous liquid ammonia with good stirring. At the end of the addition the blue color was discharged by the addition of 20 g. of ammonium chloride and the ammonia was allowed to evaporate. The product was extracted with ether, washed with water, dried and the ether evaporated to afford a gum which was adsorbed from 100 cc. of benzene onto 50 g. of alumina. Elution with benzene-ether afforded a product which upon recrystallization from acetone-hexane gave 17,20;20,21-bismethylenedioxy-allopregnan - 11β - ol-3-one.

The starting compounds under I were treated in accordance with the foregoing procedure thus yielding the products under II.

| I | II |
|---|---|
| 16β-methyl-17,20;20,21-bismethylenedioxy-Δ⁴-pregnen-11β-ol-3-one. | 16β-methyl-17,20;20,21-bismethylenedioxy-allopregnan-11β-ol-3-one. |
| 16α-methyl-17,20;20,21-bismethylenedioxy-Δ⁴-pregnen-11β-ol-3-one. | 16α-methyl-17,20;20,21-bismethylenedioxy-allopregnan-11β-ol-3-one. |

Example III

A solution of 3 g. of 17,20;20,21-bismethylenedioxy-allopregnan-11β-ol-3-one, in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the formed precipitate filtered, washed with water to neutral and dried under vacuum. Recrystallization from acetone-hexane yielded 2α-bromo-17,20;20,21-bismethylenedioxy-allopregnan-11β - ol - 3-one.

Upon treatment of the starting compounds set forth below, by the above method, there were obtained the corresponding products hereinafter disclosed.

| Starting Compounds | Product |
|---|---|
| 16β-methyl-17,20;20,21-bismethylenedioxyallopregnan-11β-ol-3-one. | 16β-methyl-2α-bromo-17,20;20,21-bismethylenedioxy-allopregnan-11β-ol-3-one. |
| 16α-methyl-17,20;20,21-bismethylenedioxy-allopregnan-11β-ol-3-one. | 16α-methyl-2α-bromo-17,20;20, 21-bismethylenedioxy-allopregnan-11β-ol-one. |

Example IV 2 g. of 2α-bromo-17,20;20,21-bismethylenedioxy-allopregnan-11β-ol-3-one in 40 cc. of cold dimethylformamide was added over 15 minutes to a suspension of 5 g. of finley divided calcium carbonate in 15 cc. of refluxing dimethylformamide. The mixture was refluxed for 15 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 17,20;20,21-bismethylenedioxy-Δ¹-allopregnen-11β-ol-3-one.

The starting compounds under I were treated by the procedure described above, to produce the corresponding products under II.

| I | II |
|---|---|
| 16β-methyl-2α-bromo-17,20;20,21-bismethylenedioxy-allopregnan-11β-ol-3-one. | 16β-methyl-17,20;20,21-bismethylenedioxy-Δ¹-allopregnen-11β-ol-3-one. |
| 16α-methyl-2α-bromo-17,20;20,21-bismethylenedioxy-allopregnan-11β-ol-3-one. | 16α-methyl-17,20;20,21-bismethylenedioxy-Δ¹-allopregnen-11β-ol-3-one. |

Example V

A solution of 5 g. of 17,20;20,21-bismethylenedioxy-Δ¹-allopregnen-11β-ol-3-one (obtained according to the foregoing example) in 350 cc. of methanol was treated while stirring with 20 cc. of a 4 N aqueous solution of sodium hydroxide and 20 cc. of 30% hydrogen peroxide, keeping the temperature at approximately 15° C. The solution was left at 0° C. overnight, then poured into ice water. The formed precipitate was filtered, washed with water and dried. Recrystallization from acetone-hexane gave 1α,2α-oxido-17,20;20,21-bismethylenedioxy-allopregnan-11β-ol-3-one.

Following the foregoing method, there were treated the starting compounds set forth below, thus affording the corresponding hereinafter disclosed products:

| Starting Compounds | Products |
|---|---|
| 16β-methyl-17,20;20,21-bismethylenedioxy-Δ¹-allopregnen-11β-ol-3-one. | 1α,2α-oxido-16β-methyl-17,20;20,21-bismethylenedioxy-allopregnan-11β-ol-3-one. |
| 16α-methyl-17,20;20,21-bismethylenedioxy-Δ¹-allopregnen-11β-ol-3-one. | 1α,2α-oxido-16α-methyl-17,20;20,21-bismethylenedioxy-allopregnan-11β-ol-3-one. |

Example VI

A solution of 4 g. of 1α,2α-oxido-17,20;20,21-bismethylenedioxy-allopregnan-11β-ol-3-one in 200 cc. of tetrahydrofuran was added over a 30 minutes period to a stirred suspension of 4 g. of lithium aluminum hydride in 200 cc. of anhydrous tetrahydrofuran. The mixture was refluxed for 2 hours, then cooled and cautiously treated with 200 cc. of ethyl acetate and 5 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17,20;20,21-bismethylenedioxy-allopregnane 1α,3β,11β-triol.

By the same precedure, the starting compounds under I were converted into the corresponding products under II.

| I | II |
|---|---|
| 1α,2α-oxido-16β-methyl-17,20;20,21-bismethylenedioxy-allopregnan-11β-ol-3-one. | 16β-methyl-17,20;20,21-bismethylenedioxy-allopregnane-1α,3β,11β-triol. |
| 1α,2α-oxido-16α-methyl-17,20;20,21-bismethylenedioxy allopregnan-11β-ol-3-one. | 16α-methyl-17,20;20,21-bismethylenedioxy-allopregnane-1α,3β,11β-triol. |

Example VII

A mixture of 3 g. of 17,20;20,21-bismethylendioxy-allopregnane-1α,3β,11β-triol, 14 cc. of pyridine and 1.1 molar equivalents of acetic anhydride was kept at room temperature overnight, poured into ice water, the formed precipitate was filtered, washed with water and dried. Crystallization from acetone-hexane gave the 3-acetate of 17,20;20,21-bismethylenedioxy - allopregnane-1α,3β,11β-triol.

Following the above procedure there were treated the starting compounds set forth below, thus yielding the corresponding products hereinafter disclosed:

| Starting compounds | Products |
|---|---|
| 16β-methyl-17,20;20,21-bismethylenedioxy-allopregnane-1α,3β,11β-triol. | The 3-acetate of 16β-methyl-17,20;20,21-bismethylenedioxy-allopregnane-1α,3β,11β-triol. |
| 16α-methyl-17,20;20,21-bismethylenedioxy-allopregnane-1α,3β,11β-triol. | The 3-acetate of 16α-methyl-17,20;20,21-bismethylenedioxy-allopregnane-1α,3β,11β-triol. |

Example VIII

A solution of 2 g. of the 3-acetate of 17,20;20,21-bismethylenedioxy-allopregnane-1α,3β,11β-triol in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulufric acid and diluting with water to 100 cc.) until the color of the reagent persisted in the mixture. It was stirred for 5 minutes further at 0-5° C. and diluted with water. The precipitate was collected, washed with water and dried under vacuum, thus affording a crude product which upon recrystallization from acetone-hexane gave 17,20;20,21-bismethylenedioxy-allopregnan-3β - ol-1,11-dione-acetate.

In accordance with the above procedure, there were treated the starting compounds under I thus furnishing the corresponding products under II.

| I | II |
|---|---|
| The 3-acetate of 16β-methyl-17,20;20,21-bismethylenedioxy-allopregnane-1α,3β,11β-triol. | 16β-methyl-17,20;20,21-bismethylenedioxy-allopregnan-3β-ol-1,11-dione-acetate. |
| The 3-acetate of 16α-methyl-17,20;20,21-bismethylenedioxy-allopregnane-1α,3β,11β-triol. | 16α-methyl-17,20;20,21-bismethylenedioxy-allopregnan-3β-ol-1,11-dione-acetate. |

Example IX

A mixture of 5 g. of 17,20;20,21-bismethylenedioxy-allopregnan-3β-ol-1,11-dione-acetate (obtained in accordance with the foregoing example), 10 g. of potassium acetate and 250 cc. of methanol, was boiled under reflux for 1 hour. Thereafter, it was cooled and poured into water. The formed precipitate was filtered off, dried and recrystallized from methylene chloride-hexane to give 17,20;20,21 - bismethylenedioxy-Δ²-allopregnene-1,11-dione.

The starting compounds disclosed below were treated according to the above method, thus yielding the corresponding products hereinafter set forth.

| Starting Compounds | Products |
|---|---|
| 16β-methyl-17,20;20,21-bismethylenedioxy-allopregnan-3β-ol-1,11-dione-acetate. | 16β-methyl-17,20;20,21-bismethylenedioxy-Δ²-allopregnene-1,11-dione. |
| 16α-methyl-17,20;20,21-bismethylenedioxy-allopregnan-3β-ol-1,11-dione-acetate. | 16α-methyl-17,20;20,21-bismethylenedioxy-Δ²-allopregnene-1,11-dione. |

Example X 4.2 g. of 17,20;20,21-bismethylenedioxy-Δ²-allopregnene-1,11-dione in 200 cc. of carbon tetrachloride was refluxed with 2.7 g. of N-bromosuccinimide for 1½ hours, under irradiation with a G.E. 100 w. lamp. The mixture was filtered to eliminate the succinimide that is formed during the reaction. The filtrate was evaporated to dryness under reduced pressure. Recrystallization from methylene-chloride-hexane gave 4β-bromo-17,20;20,21-bismethylenedioxy-Δ²-allopregnene-1,11-dione. 4 g. of the above compound was refluxed with 4 g. of calcium carbonate and 200 cc. of dimethylformamide for 30 minutes. The mixture filtered, the solvent evaporated under reduced pressure and the residue crystallized from acetone-hexane to afford 17,20:20,21-bismethylenedioxy-Δ²,⁴-pregnadiene-1,11-dione.

The starting compounds under I were treated by the two foregoing procedures, thus yielding successively the corresponding 4β-bromo compounds and thereafter the products under II.

| I | II |
|---|---|
| 16β-methyl-17,20;20,21-bismethylenedioxy-Δ²-allopregnene-1,11-dione. | 16β-methyl-17,20;20,21-bismethylenedioxy-Δ²,⁴-pregnadiene-1,11-dione. |
| 16α-methyl-17,20;20,21-bismethylenedioxy-Δ²-allopregnene-1,11-dione. | 16α-methyl-17,20;20,21-bismethylenedioxy-Δ²,⁴-pregnadiene-1,11-dione. |

*Example XI*

A solution of 3 g. of 17,20;20,21-bismethylenedioxy-Δ²,⁴-pregnadiene-1,11-dione in 150 cc. of tetrahydrofuran was added over a 30 minutes period to a stirred suspension of 3 g. of lithium aluminum hydride in 150 cc. of anhydrous tetrahydrofuran. The mixture was refluxed for 24 hours, then cooled and cautiously treated with 15 cc. of ethyl acetate and 6 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17,20;20,21-bismethylenedioxy-Δ²,⁴-pregnadiene-1β,11β-diol.

By the same procedure the starting compounds set forth below were converted into the corresponding products hereinafter disclosed.

| Starting Compounds | Products |
|---|---|
| 16β-methyl-17,20;20,21-bismethylenedioxy-Δ²,⁴-pregnadiene-1,11-dione. | 16β-methyl-17,20;20,21-bismethylenedioxy-Δ²,⁴-pregnadiene-1β,11β-diol. |
| 16α-methyl-17,20;20,21-bismethylenedioxy-Δ²,⁴-pregnadiene-1,11-dione. | 16α-methyl-17,20;20,21-bismethylenedioxy-Δ²,⁴-pregnadiene-1β,11β-diol. |

*Example XII*

A mixture of 2 g. of 17,20;20,21-bismethylenedioxy-Δ²,⁴-pregnadiene-1β,11β-diol in 40 cc. of dioxane and 1.1 molar equivalents of 2,3-dichloro, 5,6-dicyano 1,4-benzoquinone was kept at room temperature for 3 hours. The hydroquinone formed during the reactions was filtered off and the filtrate evaporated to dryness. The residue was dissolved in acetone and filtered through 40 g. of alumina. Crystallization from acetone hexane gave 17,20;20,21-bismethylenedioxy - Δ²,⁴ - pregnadien-11β-ol-1-one.

The starting compounds under I were treated by the above procedure, thus furnishing the products under II.

| I | II |
|---|---|
| 16β-methyl-17,20;20,21-bismethylenedioxy-Δ²,⁴-pregnadiene-1β,11β-diol. | 16β-methyl-17,20;20,21-bismethylenedioxy-Δ²,⁴-pregnadien-11β-ol-1-one. |
| 16α-methyl-17,20;20,21-bismethylenedioxy-Δ²,⁴-pregnadiene-1β,11β-diol. | 16α-methyl-17,20;20,21-bismethylenedioxy-Δ²,⁴-pregnadien-11β-ol-1-one. |

*Example XIII*

1 g. of 17,20;20,21-bismethylenedioxy-Δ²,⁴-pregnadien-11β-ol-1-one was dissolved with slow heating in 12.5 cc. of dimethyl-formamide, the mixture was cooled, 0.42 g. of mesyl chloride and 0.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 17,20;20,21-bismethylenedioxy-Δ²,⁴,⁹⁽¹¹⁾-pregnatrien-1-one.

By the above procedure, 16β-methyl-17,20;20,21-bismethylenedioxy-Δ²,⁴-pregnadien - 11β - ol-1-one and 16α-methyl - 17,20;20,21 - bismethylenedioxy-Δ²,⁴-pregnadien-11β-ol-1-one were respectively converted into: 16β-methyl-17,20;20,21 - bismethylenedioxy - Δ²,⁴,⁹⁽¹¹⁾-pregnatrien-1-one.

*Example XIV*

2.8 g. of N-bromoacetamide were added to a mixture of 5 g. of 17,20;20,21-bismethylenedioxy-Δ²,⁴,⁹⁽¹¹⁾-pregnatrien-1-one (obtained according with the preceding example), 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9α-bromo-11β-ol.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 9β,11β-oxido-17,20;20,21-bismethylenedioxy-Δ²,⁴-pregnadien-1-one.

Following the foregoing procedure were treated 16β-methyl-17,20;20,21-bismethylenedioxy - Δ²,⁴,⁹⁽¹¹⁾ - pregnatrien-1-one and 16α-methyl - 17,20;20,21 - bismethylenedioxy-Δ²,⁴,⁹⁽¹¹⁾-pregnatrien - 1 - one giving respectively: 9β,11β - oxido - 16β - methyl-17,20;20,21-bismethylenedioxy-Δ²,⁴-pregnadien - 1 - one and 9β,11β- oxido-16α-methyl-17,20;20,21-bismethylenedioxy - Δ²,⁴ - pregnadien-1-one.

*Example XV*

In a polyethylene flask, adapted with magnetic stirrer, there was dissolved 1.8 g. of 9β,11β-oxido-17,20;20,21-bismethylenedioxy - Δ²,⁴ - pregnadien-1-one in 30 cc. of methylene chloride, the solution was cooled to 0° C. and a solution of 2.11 g. of anhydrous hydrogen fluoride in 3.7 cc. of tetrahydrofurane cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 9α - fluoro - 17,20;20,21 - bismethylenedioxy - Δ²,⁴-pregnadien-11β-ol-1-one.

By the same procedure: 9β,11β-oxido - 16β - methyl- 17,20;20,21 - bismethylenedioxy - $\Delta^{2,4}$ - pregnadien-1-one and 9$\beta$,11$\beta$ - oxido - 16$\alpha$ - methyl - 17,20;20,21 - bismethylenedioxy-$\Delta^{2,4}$-pregnadien-1-one, were respectively transformed into: 9$\alpha$ - fluoro - 16$\beta$ - methyl-17,20;20,21-bismethylenedioxy-$\Delta^{2,4}$-pregnadien - 11$\beta$ - ol - 1 - one and 9$\alpha$-fluoro-16$\alpha$-methyl - 17,20;20,21 - bismethylenedioxy-$\Delta^{2,4}$-pregnadien-11$\beta$-ol-1-one.

*Example XVI*

9$\alpha$-fluoro-16$\beta$-methyl - 17,20;20,21 - bismethylenedioxy-$\Delta^{2,4}$-pregnadien-11$\beta$-ol-1-one, 9$\alpha$ - fluoro - 16$\alpha$ - methyl-17,20;20,21-bismethylenedioxy - $\Delta^{2,4}$ - pregnadien-11$\beta$-ol-1-one and 9$\alpha$-fluoro-17,20;20,21-bismethylenedioxy - $\Delta^{2,4}$-pregnadien - 11$\beta$ - ol - 1 - one, were treated following the procedure described in Example VIII thus yielding respectively: 9$\alpha$-fluoro-16$\beta$-methyl - 17,20;20,21 - bismethylenedioxy - $\Delta^{2,4}$ - pregnadiene - 1,11 - dione, 9$\alpha$-fluoro-16$\alpha$-methyl - 17,20;20,21 - bismethylenedioxy-$\Delta^{2,4}$-pregnadiene-1,11-dione, and 9$\alpha$-fluoro-17,20;20,21-bismethylenedioxy-$\Delta^{2,4}$-pregnadiene-1,11-dione.

*Example XVII*

1 g. of 17,20;20,21-bismethylenedioxy-$\Delta^{2,4}$-pregnadien-11$\beta$-ol-1-one was heated on the steam bath with 20 cc. of 60% formic acid for 1 hour, cooled, diluted with water and the precipitate was collected, washed with water, dried, and recrystallized from acetone-hexane, thus affording $\Delta^{2,4}$-pregnadiene - 11$\beta$,17$\alpha$,21 - triol - 1,20-dione.

The starting compounds listed below were treated by the foregoing technique, thus giving corresponding products hereinafter disclosed:

| Starting Compounds | Products |
|---|---|
| 9$\alpha$-fluoro-17,20; 20,21-bismethyl-enedioxy-$\Delta^{2,4}$-pregnadien-11$\beta$-ol-1-one. | 9$\alpha$-fluoro-$\Delta^{2,4}$-pregnadiene-11$\beta$, 17$\alpha$, 21-triol-1, 20-dione. |
| 16$\beta$-methyl-17, 20; 20, 21-bismethyl-enedioxy-$\Delta^{2,4}$-pregnadien-11$\beta$-ol-1-one. | 16$\beta$-methyl-$\Delta^{2,4}$-pregnadiene-11$\beta$, 17$\alpha$, 21-triol,-1, 20-dione. |
| 16$\beta$-methyl-9$\alpha$-fluoro-17, 20; 20, 21-bismethylenedioxy-$\Delta^{2,4}$-pregnadien-11$\beta$-ol-1-one. | 16$\beta$-methyl-9$\alpha$-flouro-$\Delta^{2,4}$-pregnadiene-11$\beta$- 17$\alpha$, 21-triol-1, 20-dione. |
| 16$\alpha$-methyl-17, 20; 20, 21-bismethyl-enedioxy-$\Delta^{2,4}$-pregnadien-11$\beta$-ol-1-one. | 16$\alpha$-methyl-$\Delta^{2,4}$-pregnadiene-11$\beta$, 17$\alpha$, 21-triol-1, 20-dione. |
| 16$\alpha$-methyl-9$\alpha$-fluoro-17, 20; 20, 21-bismethylenedioxy-$\Delta^{2,4}$-pregnadien-11$\beta$-ol-1-one. | 16$\alpha$-methyl-9$\alpha$-fluoro-$\Delta^{2,4}$-pregnadiene-11$\beta$, 17$\alpha$, 21-triol-1, 20-dione. |
| 9$\alpha$-fluoro-17, 20; 20, 21-bismethyl-enedioxy-$\Delta^{2,4}$-pregnadiene-1, 11-dione. | 9$\alpha$-fluoro-$\Delta^{2,4}$-pregnadiene-17$\alpha$, 21-diol-1, 11, 20-trione. |
| 16$\beta$-methyl-17, 20; 20, 21-bismethyl-enedioxy-$\Delta^{2,4}$-pregnadiene-1, 11-dione. | 16$\beta$-methyl-$\Delta^{2,4}$-pregnadiene-17$\alpha$, 21-diol-1, 11, 20-trione. |
| 16$\beta$-methyl-9$\alpha$-fluoro-17, 20; 20, 21-bismethylenedioxy-$\Delta^{2,4}$-pregnadiene-1, 11-dione. | 16$\beta$-methyl-9$\alpha$-fluoro-$\Delta^{2,4}$-pregnadiene-17$\alpha$, 21-diol-1, 11, 20-trione. |
| 16$\alpha$-methyl-17, 20; 20, 21-bismethyl-enedioxy-$\Delta^{2,4}$-pregnadiene-1, 11-dione. | 16$\alpha$-methyl-$\Delta^{2,4}$-pregnadiene-17$\alpha$, 21-diol-1, 11, 20-trione. |
| 16$\alpha$-methyl-9$\alpha$-fluoro-17, 20; 20, 21-bismethylenedioxy-$\Delta^{2,4}$-pregnadiene-1, 11-dione. | 16$\alpha$-methyl-9$\alpha$-fluoro-$\Delta^{2,4}$-pregnadiene-17$\alpha$, 21-diol-1, 11, 20-trione. |
| 17, 20; 20, 21-bismethylenedioxy-$\Delta^{2,4}$-pregnadiene-1, 11-dione. | $\Delta^{2,4}$-pregnadiene-17$\alpha$, 21-diol-1, 11, 20-trione. |

*Example XVIII*

A mixture of 1 g. of $\Delta^{2,4}$-pregnadiene-11$\beta$,17$\alpha$,21-triol-1,20-dione 4 cc. of pyridine and 2 cc. of acetic anhydride was kept at room temperature overnight, poured into ice water, the formed precipitate was filtered, washed with water and dried. Crystallization from acetone-hexane gave the 21-acetate of $\Delta^{2,4}$-pregnadiene-11$\beta$,17$\alpha$,21-triol-1,20-dione.

Following the above procedure were treated the starting compounds under I, thus yielding the corresponding products under II.

| I | II |
|---|---|
| 9$\alpha$-fluoro-$\Delta^{2,4}$-pregnadiene-11$\beta$,17$\alpha$, 21-triol-1,20-dione. | The 21-acetate of 9$\alpha$-fluoro-$\Delta^{2,4}$-pregnadine-11$\beta$,17$\alpha$,21-triol-1,20-dione. |
| 16$\beta$,methyl-$\Delta^{2,4}$-pregnadiene-11$\beta$, 17$\alpha$,21-triol-1,20-dione. | The 21-acetate of 16$\beta$-methyl-$\Delta^{2,4}$-pregnadiene-11$\beta$,17$\alpha$,21-triol-1,20-dione. |
| 16$\beta$-methyl-9$\alpha$-fluoro-$\Delta^{2,4}$-pregnadiene-11$\beta$,17$\alpha$,21-triol-1,20-dione. | The 21-acetate of 16$\beta$-methyl-9$\alpha$-fluoro-$\Delta^{2,4}$-pregnadiene-11$\beta$,17$\alpha$, 21-triol-1,20-dione. |
| 16$\alpha$-methyl-$\Delta^{2,4}$-pregnadiene-11$\beta$, 17$\alpha$,21-triol-1,20-dione. | The 21-acetate of 16$\alpha$-methyl-$\Delta^{2,4}$-pregnadiene-11$\beta$,17$\alpha$,21-triol-1,20-dione. |
| 16$\alpha$-methyl-9$\alpha$-fluoro-$\Delta^{2,4}$-pregnadiene-11$\beta$,17$\alpha$,21-triol-1,20-dione. | The 21-acetate of 16$\alpha$-methyl-9$\alpha$-fluoro-$\Delta^{2,4}$-pregnadiene-11$\beta$,17$\alpha$, 21-triol-1,20-dione. |
| 9$\alpha$-fluoro-$\Delta^{2,4}$-pregnadiene-17$\alpha$,21-diol-1,11,20-trione. | The 21-acetate of 9$\alpha$-fluoro-$\Delta^{2,4}$-pregnadiene-17$\alpha$,21-diol-1,11,20-trione. |
| 16$\beta$-methyl-$\Delta^{2,4}$-pregnadiene-17$\alpha$, 21-diol-1,11,20-trione. | The 21-acetate of 16$\beta$-methyl-$\Delta^{2,4}$-pregnadiene-17$\alpha$,21-diol-1,11,20-trione. |
| 16$\beta$-methyl-9$\alpha$-fluoro-$\Delta^{2,4}$-pregnadiene-17$\alpha$,21-diol-1,11,20-trione. | The 21-acetate of 16$\beta$-methyl-9$\alpha$-fluoro-$\Delta^{2,4}$-pregnadiene-17$\alpha$,21-diol-1,11,20-trione. |
| 16$\alpha$-methyl-$\Delta^{2,4}$-pregnadiene-17$\alpha$,-21-diol-1,11,20-trione. | The 21-acetate of 16$\alpha$-methyl-$\Delta^{2,4}$-pregnadiene-17$\alpha$,21-diol-1,11,20-trione. |
| 16$\alpha$-methyl-9$\alpha$-fluoro-$\Delta^{2,4}$-pregnadiene-17$\alpha$,21-diol-1,11,20-trione. | The 21-acetate of 16$\alpha$-methyl-9$\alpha$-fluoro-$\Delta^{2,4}$-pregnadiene-17$\alpha$,21-diol-1,11,20-trione. |
| $\Delta^{2,4}$-pregnadiene-17$\alpha$,21-diol-1,11, 20-trione. | The 21-acetate of $\Delta^{2,4}$-pregnadiene-17$\alpha$,21-diol-1,11,20-trione. |

*Example XIX*

The starting compounds mentioned in the foregoing example, were treated following the procedure described in the same example except that acetic anhydride was substituted by propionic anhydride, caproic anhydride and trimethylacetyl chloride, thus affording the corresponding 21-propionates, 21-caproates and 21-trimethyl acetates of said compounds.

We claim:

1. A compound of the following formula:

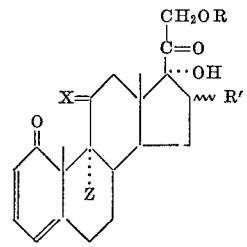

wherein R is a member of the group consisting of hydrogen and a hydrocarbon carboxylic acyl group of less than 12 carbon atoms; $R^1$ is selected from the group consisting of hydrogen, $\alpha$-methyl and $\beta$-methyl; X is a member of the group consisting of keto and $\beta$-hydroxy; and Z is selected from the group consisting of hydrogen and fluorine.

2. $\Delta^{2,4}$-pregnadiene-11$\beta$,17$\alpha$,21-triol-1,20-dione.
3. 9$\alpha$-fluoro - $\Delta^{2,4}$ - pregnadiene-11$\beta$,17$\alpha$,21-triol-1,20-dione.
4. 16$\beta$-methyl-$\Delta^{2,4}$-pregnadiene - 11$\beta$,17$\alpha$,21-triol-1,20-dione.
5. 16$\beta$-methyl-9$\alpha$-fluoro-$\Delta^{2,4}$-pregnadiene - 11$\beta$,17$\alpha$,21-triol-1,20-dione.
6. 16$\alpha$-methyl-$\Delta^{2,4}$-pregnadiene - 11$\beta$,17$\alpha$,21-triol-1,20-dione.
7. 16$\alpha$-methyl-9$\alpha$-fluoro-$\Delta^{2,4}$-pregnadiene - 11$\beta$,17$\alpha$,21-triol-1,20-dione.
8. $\Delta^{2,4}$-pregnadiene-17$\alpha$,21-diol-1,11,20-trione.
9. 9$\alpha$-fluoro-$\Delta^{2,4}$-pregnadiene - 17$\alpha$,21- diol-1,11,20-trione.
10. 16$\beta$-methyl-$\Delta^{2,4}$-pregnadiene-17$\alpha$,21-diol - 1,11,20-trione.
11. 16$\beta$-methyl - 9$\alpha$ - fluoro-$\Delta^{2,4}$-pregnadiene - 17$\alpha$,21-diol-1,11,20-trione.
12. 16$\alpha$-methyl-$\Delta^{2,4}$-pregnadiene - 17$\alpha$,21 - diol-1,11,20-trione.

13. 16α-methyl - 9α - fluoro-$\Delta^{2,4}$-pregnadiene - 17α,21-diol-1,11,20-trione.

14. The C-21 acylates derived from hydrocarbon carboxylic acids of less than 12 carbon atoms of $\Delta^{2,4}$-pregnadiene-11β,17α,21-triol-1,20-dione.

15. The C-21 acylates derived from hydrocarbon carboxylic acids of less than 12 carbon atoms of 9α-fluoro-$\Delta^{2,4}$-pregnadiene-11β,17α,21-triol-1,20-dione.

16. The C-21 acylates derived from hydrocarbon carboxylic acids of less than 12 carbon atoms of 16β-methyl-9α-fluoro-$\Delta^{2,4}$-pregnadiene-11β,17α,21-triol-1,20-dione.

17. The C-21 acylates derived from hydrocarbon carboxylic acids of less than 12 carbon atoms of 16α-methyl-9α-fluoro-$\Delta^{2,4}$-pregnadiene-11β,17α,21-triol-1,20-dione.

18. The C-21 acylates derived from hydrocarbon carboxylic acids of less than 12 carbon atoms of $\Delta^{2,4}$-pregnadiene-17α,21-diol-1,11,20-trione.

19. The C-21 acylates derived from hydrocarbon carboxylic acids of less than 12 carbon atoms of 9α-fluoro-$\Delta^{2,4}$-pregnadiene-17α,21-diol-1,11,20-trione.

20. The C-21 acylates derived from hydrocarbon carboxylic acids of less than 12 carbon atoms of 16β-methyl-9α-fluoro-$\Delta^{2,4}$-pregnadiene-17α,21-diol-1,11,20-trione.

21. The C-21 acylates derived from hydrocarbon carboxylic acids of less than 12 carbon atoms of 16α-methyl-9α-fluoro-$\Delta^{2,4}$-pregnadiene-17α,21-diol-1,11,20-trione.

No references cited.